US007023181B2

(12) United States Patent
Nakata

(10) Patent No.: US 7,023,181 B2
(45) Date of Patent: Apr. 4, 2006

(54) CONSTANT VOLTAGE GENERATOR AND ELECTRONIC EQUIPMENT USING THE SAME

(75) Inventor: Kenichi Nakata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 77 days.

(21) Appl. No.: 10/869,866

(22) Filed: Jun. 18, 2004

(65) Prior Publication Data

US 2005/0001671 A1 Jan. 6, 2005

(30) Foreign Application Priority Data

Jun. 19, 2003 (JP) ............................. 2003-174572

(51) Int. Cl.
*H02H 7/06* (2006.01)
*H02P 11/00* (2006.01)
*H00P 9/00* (2006.01)
*G05F 3/20* (2006.01)
*G05F 1/10* (2006.01)

(52) U.S. Cl. ........................ 322/28; 323/313; 323/314; 323/315; 323/316; 327/538; 327/539

(58) Field of Classification Search .................. 322/28; 323/313–316; 327/538–539
See application file for complete search history.

(56) References Cited

U.S. PATENT DOCUMENTS

| | | | | | |
|---|---|---|---|---|---|
| 4,064,448 | A | * | 12/1977 | Eatock | 323/281 |
| RE30,586 | E | * | 4/1981 | Brokaw | 323/314 |
| 4,302,718 | A | * | 11/1981 | Schade, Jr. | 323/313 |
| 4,325,017 | A | * | 4/1982 | Schade, Jr. | 323/313 |
| 4,325,018 | A | * | 4/1982 | Schade, Jr. | 323/313 |
| 4,368,420 | A | * | 1/1983 | Kuo | 323/303 |
| 4,396,883 | A | * | 8/1983 | Holloway et al. | 323/313 |
| 4,439,637 | A | * | 3/1984 | Terry | 379/400 |
| 4,490,670 | A | * | 12/1984 | Wong | 323/313 |
| 4,491,780 | A | * | 1/1985 | Neidorff | 323/313 |
| 4,524,318 | A | * | 6/1985 | Burnham et al. | 323/313 |
| 4,525,663 | A | * | 6/1985 | Henry | 323/280 |
| 4,654,545 | A | * | 3/1987 | Giordano | 327/80 |
| 4,667,145 | A | * | 5/1987 | Moreau | 323/275 |
| 4,684,880 | A | * | 8/1987 | Chan | 323/316 |
| 4,742,281 | A | * | 5/1988 | Nakano et al. | 388/815 |
| 4,769,589 | A | * | 9/1988 | Rosenthal | 323/313 |
| 4,839,535 | A | * | 6/1989 | Miller | 327/539 |
| 4,857,823 | A | * | 8/1989 | Bitting | 323/314 |

(Continued)

FOREIGN PATENT DOCUMENTS

JP 03-164916 7/1991

(Continued)

*Primary Examiner*—Darren Schuberg
*Assistant Examiner*—Pedro J. Cuevas
(74) *Attorney, Agent, or Firm*—Arent Fox PLLC

(57) ABSTRACT

A constant voltage generator is comprised of a band gap reference circuit, a current supply circuit, a starting circuit and a voltage-current conversion circuit, and the starting circuit is further comprised of a first and second load elements, a first transistor which is connected to the first load element, a second transistor of which current capability is larger than the first transistor and which shares the voltage of the base with the first transistor and is connected to the second load element, a first resistor which is connected to the first transistor, and a second resistor which is connected to the second transistor, and the output of the voltage-current conversion circuit is input to the connection point between the second transistor and the second resistor, and the current at the connection point between the second load element and the second transistor controls the current supply circuit.

9 Claims, 6 Drawing Sheets

U.S. PATENT DOCUMENTS 4,906,863 A * 3/1990 Van Tran .................... 327/539
4,987,379 A * 1/1991 Hughes ...................... 330/253
4,999,516 A * 3/1991 Suter et al. ................. 327/539
5,001,414 A * 3/1991 Brambilla et al. .......... 323/313
5,084,665 A * 1/1992 Dixon et al. ................ 323/281
5,087,830 A * 2/1992 Cave et al. ................. 327/539
5,126,653 A * 6/1992 Ganesan et al. ............ 323/313
5,168,210 A * 12/1992 Thus .......................... 323/313
5,349,286 A * 9/1994 Marshall et al. ............ 323/315
5,352,973 A * 10/1994 Audy ......................... 323/313
5,367,249 A * 11/1994 Honnigford ................. 323/313
5,384,739 A * 1/1995 Keeth .................... 365/189.09
5,432,432 A * 7/1995 Kimura ...................... 323/313
5,453,679 A * 9/1995 Rapp .......................... 323/313
5,497,073 A * 3/1996 Bohme et al. .............. 323/312
5,506,496 A * 4/1996 Wrathall et al. ............ 323/316
5,519,308 A * 5/1996 Gilbert ....................... 323/313
5,521,489 A * 5/1996 Fukami ...................... 323/313
5,545,978 A * 8/1996 Pontius ...................... 323/313
5,604,466 A * 2/1997 Dreps et al. ............ 331/113 R
5,621,308 A * 4/1997 Kadanka et al. ............ 323/315
5,668,467 A * 9/1997 Pease ......................... 323/315
5,686,823 A * 11/1997 Rapp .......................... 323/313
5,757,210 A * 5/1998 Sanzo ......................... 327/63
5,760,640 A * 6/1998 Girard et al. ............... 327/543
5,773,967 A * 6/1998 Tenten ........................ 323/313
5,783,935 A * 7/1998 Kyung ....................... 323/313
5,801,582 A * 9/1998 Weber ........................ 327/539
5,811,993 A * 9/1998 Dennard et al. .............. 327/54
5,818,292 A * 10/1998 Slemmer .................... 327/539
RE35,951 E * 11/1998 Ganesan et al. ............ 323/313
5,838,188 A * 11/1998 Taguchi ...................... 327/530
5,867,012 A * 2/1999 Tuthill ........................ 323/313
5,886,515 A * 3/1999 Kelly ......................... 323/313
5,920,185 A * 7/1999 Ozoe .......................... 323/315
5,949,277 A * 9/1999 Iravani ....................... 327/541
5,969,566 A * 10/1999 Weber et al. ............... 327/540
5,986,481 A * 11/1999 Kaminishi ................... 327/96
5,990,672 A * 11/1999 Giacomini .................. 323/313
6,018,235 A * 1/2000 Mikuni ....................... 323/313
6,084,388 A * 7/2000 Toosky ....................... 323/313
6,104,179 A * 8/2000 Yukawa ...................... 323/316
6,124,753 A * 9/2000 Pease ......................... 327/538
6,181,122 B1 * 1/2001 Larsen et al. ............... 323/313
6,225,855 B1 * 5/2001 Taguchi ...................... 327/538
6,232,756 B1 * 5/2001 Kurihara ..................... 323/313
6,242,981 B1 * 6/2001 Tomiyama .................. 330/254
6,249,176 B1 * 6/2001 Pease ......................... 327/538
6,259,240 B1 * 7/2001 Smith ......................... 323/313
6,271,652 B1 * 8/2001 Burstein et al. ............ 323/313
6,288,525 B1 * 9/2001 Fischer ....................... 323/313
6,313,692 B1 * 11/2001 Pease ......................... 327/538
6,329,871 B1 * 12/2001 Taguchi ...................... 327/539
6,346,849 B1 * 2/2002 Pioppo ....................... 327/539
6,356,064 B1 * 3/2002 Tonda ........................ 323/313
6,359,427 B1 * 3/2002 Edwards et al. ............ 323/316
6,507,178 B1 * 1/2003 Cocetta et al. .............. 323/313
6,528,978 B1 * 3/2003 Lim ........................... 323/313
6,528,979 B1 * 3/2003 Kimura ...................... 323/313
6,529,066 B1 * 3/2003 Guenot et al. .............. 327/539
6,563,370 B1 * 5/2003 Coady ........................ 327/539
6,583,611 B1 * 6/2003 Serratoni .................... 323/313
6,600,302 B1 * 7/2003 Ghozeil et al. ............. 323/313
RE38,250 E * 9/2003 Slemmer .................... 327/539
6,630,859 B1 * 10/2003 Wang ......................... 327/539
6,657,480 B1 * 12/2003 Ochi .......................... 327/539
6,683,490 B1 * 1/2004 Kaminishi .................. 327/538
6,710,586 B1 * 3/2004 Yamamoto .................. 323/313
6,720,755 B1 * 4/2004 Sharpe-Geisler ............ 323/314
6,815,941 B1 * 11/2004 Butler ........................ 323/313
6,833,742 B1 * 12/2004 Shimizu et al. ............. 327/143
6,841,982 B1 * 1/2005 Tran ........................... 323/316
6,867,573 B1 * 3/2005 Carper ....................... 323/277
6,876,250 B1 * 4/2005 Hsu et al. ................... 327/539
6,882,133 B1 * 4/2005 Haraguchi et al. .......... 323/284
6,894,473 B1 * 5/2005 Le et al. ..................... 323/314
6,906,581 B1 * 6/2005 Kang et al. ................. 327/539
6,954,058 B1 * 10/2005 Ota et al. ................... 323/315
2003/0067291 A1 * 4/2003 Hong ......................... 323/315

FOREIGN PATENT DOCUMENTS

JP 07-230332 8/1995

* cited by examiner

CONSTANT VOLTAGE GENERATOR AND ELECTRONIC EQUIPMENT USING THE SAME

BACKGROUND OF THE INVENTION

1. Field of the Invention

The present invention relates to a constant voltage generator for outputting constant voltage, and more particularly to a constant voltage generator comprising an improved starting circuit, and relates to electronic equipment using such a constant voltage generator.

2. Description of the Related Art

A constant voltage generator is widely used for electronic circuits for securing the accuracy of an analog circuit or decreasing the power consumption of a circuit. One type of constant voltage generator is one using a band gap reference circuit (e.g. Japanese Patent Application Laid-Open No. H3-164916, Japanese Patent Application Laid-Open No. H7-230332). A band gap reference circuit is constructed by combining matched transistors on a semiconductor integrated circuit, and the advantage is that it does not depend on temperature.

A constant voltage generator using a band gap reference circuit requires a transistor for supplying current to the load connected to the output. An example of the circuit format of this transistor is an emitter follower type, where an emitter is connected to the output of the constant voltage generator, however a higher power supply voltage for the amount of forward bias voltage (Vf) between the emitter and the base is required, so this is not appropriate for decreasing the power supply voltage, which is a problem to be described later. Therefore in this description of the related art, a circuit type where a transistor, of which collector is connected to the output of the constant voltage generator, supplies current, will be described. If MOS transistors instead of bipolar transistors constitute the constant voltage generator, a P-type MOS transistor, of which drain is connected to the output of the constant voltage generator, is used to supply current.

FIG. 6 is a circuit diagram depicting a constant voltage generator of the first prior art described in Japanese Patent Application Laid-Open No. H3-164916.

The constant voltage generator 110 of the first prior art is comprised of a band gap reference circuit 111, a current supply circuit 112, a starting circuit 113, a voltage-current conversion circuit 114 and a starting detection circuit 115.

The band gap reference circuit 111 generates the constant voltage ($V_{ref}$) for the constant voltage generator 110 to output from the output terminal ($V_{REF}$). The current supply circuit 112 supplies current to the load connected to the output terminal ($V_{REF}$), and to the above-mentioned band gap reference circuit 111. The starting circuit 113 starts up the band gap reference circuit 111 by forcibly flowing current to the current supply circuit 112 when the power supply voltage (VCC) is started. The voltage-current conversion circuit 114 converts the voltage of the output terminal ($V_{REF}$) into current, and outputs the current to the current supply circuit 112. And the starting detection circuit 115 detects that the power supply voltage (VCC) started up to prevent the starting circuit 113 from influencing the constant voltage generator 110, which will be described later.

The band gap reference circuit 111 is comprised of resistors 124 and 125 which are connected to the output terminal ($V_{REF}$) in parallel and have a same resistance value, a diode-connected transistor 121 which is connected to the other end of the resistor 124, a transistor 122 which has a larger emitter-base area (larger current capability) than the transistor 121, and is connected to the other end of the resistor 125 with sharing the base voltage with the transistor 121, a resistor 120 which is connected to the emitter of the transistor 122, and a transistor 123 of which base is connected to the connection point between the resistor 125 and the transistor 122, and of which emitter is grounded. By this configuration, voltage for outputting the constant voltage ($V_{ref}$) from the output terminal ($V_{REF}$) is generated.

The current supply circuit 112 is comprised of a resistor 128 and transistor 126, and a resistor 129 and transistor 127, which become a current mirror. These transistors 126 and 127 are PNP types. The transistor 126 supplies current to the output terminal ($V_{REF}$), and this current is controlled by adjusting the current that flows through the transistor 127.

The starting circuit 113 is comprised of a resistor 130 which is connected to the power supply voltage (VCC), two stages of diodes 131 and 132 which are connected to the resistor 130, a transistor 133 of which base is connected to the connection point between the resistor 130 and diode 131, and a resistor 134 which is connected to the emitter of the transistor 133.

In this starting circuit 113, when the power supply voltage (VCC) starts up, the base voltage of the transistor 133 becomes double the forward bias voltage (Vf) by the two stages of diodes 131 and 132, and the transistor 133 turns ON. In this transistor 133, current, which is determined by the resistance value of the resistor 134, flows, and the current flows to the transistor 127 of the above-mentioned current supply circuit 112. As a result, the current is supplied from the transistor 126 to the output terminal ($V_{REF}$) and the above-mentioned band gap reference circuit 111, and the band gap reference circuit 111 is started up.

In the starting detection circuit 115, the base voltage of the transistor 133 of the starting circuit 113 is decreased to turn the transistor 133 OFF by the ON current of the transistor 143 after the power supply voltage (VCC) is started up.

The voltage-current conversion circuit 114 is comprised of a transistor 139 of which base is connected to the output terminal ($V_{REF}$), and a resistor 140 which is connected to the emitter of the transistor 139. The voltage of the emitter of the transistor 139 is lower than the constant voltage ($V_{ref}$) of the output terminal ($V_{REF}$) for the amount of the forward bias voltage (Vf), and this voltage is applied to the resistor 140. Therefore after the power supply voltage is started up, the above-mentioned current supply circuit 112 is controlled by current determined by the resistance value of this resistor 140.

In this constant voltage generator of the first prior art, current according to the constant voltage ($V_{ref}$) of the output terminal ($V_{REF}$) can be supplied from the current supply circuit 112 to the output terminal ($V_{REF}$) by using the above-mentioned configuration for the voltage-current conversion circuit 114.

FIG. 7 is a circuit diagram depicting a constant voltage generator of the second prior art described in Japanese Patent Application Laid-Open No. H7-230332. The constant voltage generator 150 of the second prior art is comprised of a band gap reference circuit 151, a current supply circuit 152 and a starting circuit 153. This band gap reference circuit 151 substantially has the same configuration of the band gap reference circuit 111 of the first prior art.

The current supply circuit 152 substantially plays the same function as the current supply circuit 112 of the first prior art, and is comprised of transistors 166 and 167, which become a current mirror. These transistors 166 and 167 are also PNP types. The transistor 166 supplies current to the output terminal ($V_{REF}$), and the current is controlled by adjusting the current that flows through the transistor 167 using the transistor 163 of the band gap reference circuit 151.

The starting circuit 153 is comprised of a resistor 170 which is connected to the power supply voltage (VCC), two stages of diodes 171 and 172 which are connected to the resistor 170, and a diode 173 which is connected to the connection point between the resistor 170 and the diode 171. This starting circuit 153 substantially plays the same function as the starting circuit 113 of the first prior art, but starting is executed by supplying current directly from the resistor 170 to the band gap reference circuit 151, without using transistors.

The diode 173 of the starting circuit 153 is for preventing the starting circuit 153 from influencing the constant voltage generator 150 after the power supply voltage (VCC) is started up. The output of the transistor 163 of the band gap reference circuit 151 is directly input to the current supply circuit 152.

Therefore in the constant voltage generator 150 of the second prior art, the voltage-current conversion circuit 114 and the starting detection circuit 115 of the first prior art can be omitted, which can make the configuration simpler.

SUMMARY OF THE INVENTION

As described above, in the above-mentioned constant voltage generators 110 and 150, PNP transistors in a current mirror configuration are disposed in the current supply circuits 112 or 152, and stable current is supplied to the output ($V_{REF}$) by controlling the input of this current mirror configuration. In the constant voltage generators 110 and 150, the starting circuit 113 or 153 which has two stages of diodes is disposed, but once the band gap reference circuit 111 or 151 is started, the influence of the starting circuit 113 or 153 on the constant voltage generators 110 and 150 is prevented.

However these constant voltage generators 110 and 150 are not intended to operate with a low power supply voltage (VCC), and it is difficult to apply these constant voltage generators to about 1.3V of low power supply voltage (VCC). In other words, the forward bias voltage (Vf) is about 0.7V, and about 1.4V of voltage is required merely for the two stages of diodes connected in a series. Also this forward bias voltage (Vf) normally increases as the temperature decreases, so if the temperature environment is considered, this application is even more difficult.

Recently demands for lower voltage for the power supply voltage (VCC) of constant voltage generators is becoming stronger not only for portable electronic equipment but also for stationary type electronic equipment, this is due to low power consumption issues. On the other hand, cases when 1 mA or more of large current is demanded for the output current are increasing, even if the power supply voltage (VCC) thereof is about 1.3V of low voltage.

Also these constant voltage generators 110 and 150 are based on the assumption that a predetermined current is supplied from the current supply circuit to the output terminal ($V_{REF}$), and are not for compensating the difference of the load connected to the output terminal ($V_{REF}$) using the current supply circuit by negative feedback.

Also the transistors of the current supply circuit of these constant voltage generators 110 and 150 have a current mirror configuration, so a large current also flows through the transistor at the control side, which is in a pair relationship with the transistor at the output side. It is possible to minimize this current by increasing the size ratio of the pair, but this has practical limitations. For example, if the constant voltage generator is designed such that this size ratio is 1:100 and the control side matches a predetermined layout rule, then the area of the output side becomes so large that practical implementation is impossible.

An object of the present invention is to provide a constant voltage generator for decreasing the power consumption and outputting a required current, while decreasing the power supply voltage (VCC).

To solve the above problem, the constant voltage generator according to the present invention comprises a band gap reference circuit which is connected to an output terminal and generates constant voltage, a current supply circuit which is connected to the output terminal and supplies current thereto, a starting circuit for controlling the current that flows through the current supply circuit during starting and after starting, and a voltage-current conversion circuit for converting the fluctuation of voltage of the output terminal to the fluctuation of current, wherein the starting circuit further comprises a first and second load elements, that are, for instance, a constant current supply, a first transistor which is connected to the first load element, a second transistor, of which current capability is larger than the first transistor, which shares the voltage of the control terminal with the first transistor, and which is connected to the second load element, a first resistor which is connected to the first transistor, and a second resistor which is connected to the second transistor, and output of the voltage-current conversion circuit is input to the connection point between the second transistor and the second resistor, and the current at the connection point between the second load element and second transistor controls the current supply circuit.

This constant voltage generator has a configuration where only one forward bias voltage (Vf) of the transistor is generated in the current path from the power supply voltage (VCC) to the ground potential, so it operates sufficiently even if the power supply voltage (VCC) is 1.3V. Also the current to be supplied by the current supply circuit is controlled by negative feedback, so the current can be supplied according to the load.

According to the present invention, a constant voltage generator that can operate even if the power supply voltage (VCC) is low, such as 1.3V, and can output current according to the load of the output terminal ($V_{REF}$), and can output 1 mA or more of current without consuming unnecessary current can be provided, and electronic equipment that can operate even if the power supply voltage (VCC) is low and the large current is consumed can be achieved.

DESCRIPTION OF THE PREFERRED EMBODIMENTS

Figure 1:
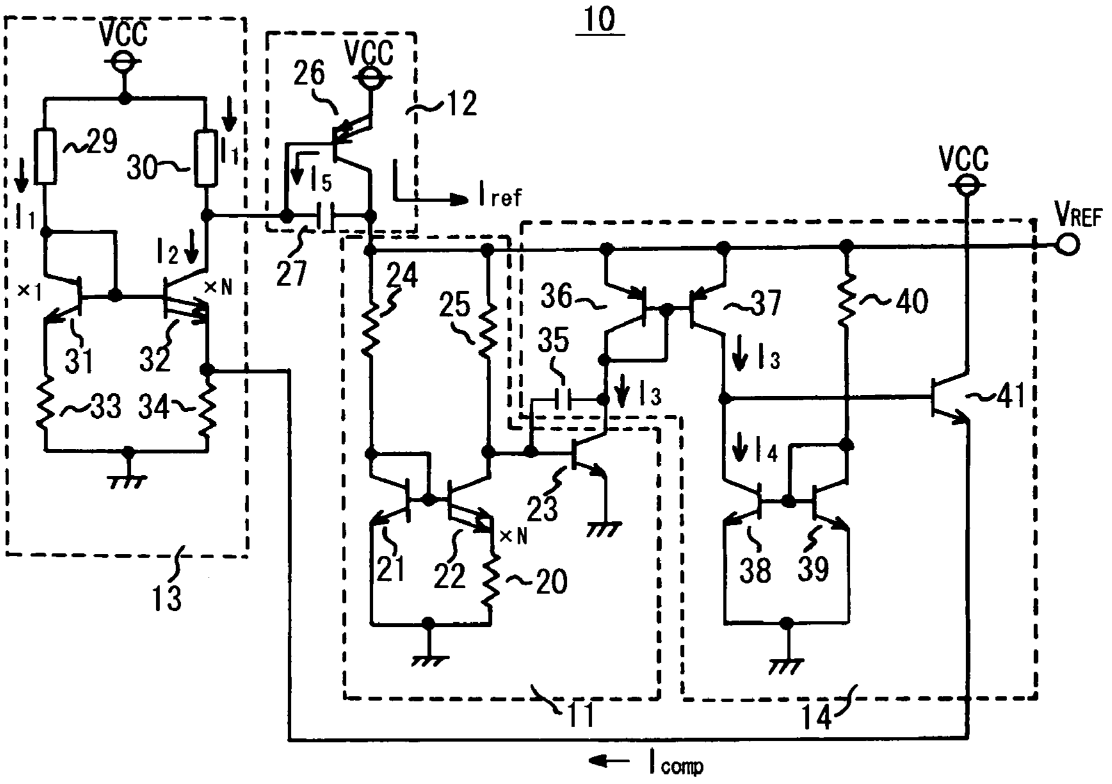
FIG. 1 is a circuit diagram of a constant voltage generator according to the first embodiment of the present invention.

Embodiments of the present invention will now be described with reference to the drawings. FIG. 1 is a circuit diagram of a constant voltage generator according to an embodiment of the present invention. The constant voltage generator 10 is comprised of a band gap reference circuit 11, a current supply circuit 12, a starting circuit 13, and a voltage-current conversion circuit 14.

The band gap reference circuit 11 generates the constant voltage ($V_{ref}$) which is output from the output terminal ($V_{REF}$). The current supply circuit 12 supplies current ($I_{ref}$) to the load connected to the output terminal ($V_{REF}$) and the band gap reference circuit 11. The starting circuit 13 forcibly supplies the current to the current supply circuit 12 when the power supply voltage (VCC) is started up, and starts the band gap reference circuit 11. The band gap reference circuit 11 stabilizes not only at the constant voltage ($V_{ref}$) but when the voltage is 0, but by this startup, the constant voltage ($V_{ref}$) is normally generated from the band gap reference circuit 11.

The voltage-current conversion circuit 14 detects the amount of load connected to the output terminal ($V_{REF}$), converts the subtle fluctuation of the constant voltage ($V_{ref}$) into feedback current ($I_{comp}$), and outputs it to the starting circuit 13.

In other words, the voltage-current conversion circuit 14 decreases the feedback current ($I_{comp}$) if the load connected to the output terminal ($V_{REF}$) consumes much current and voltage drops even slightly. And if the feedback current ($I_{comp}$) from the voltage-current conversion circuit 14 decreases, the starting circuit 13 increases the control current ($I_5$) for controlling the current supply circuit 12. If this control current ($I_5$) increases, the current supply circuit 12 increases the current ($I_{ref}$) to be supplied to the output terminal ($V_{REF}$) of the constant voltage generator 10 so as to increase the voltage thereof. In this way, the output terminal ($V_{REF}$) of the constant voltage generator 10 is maintained at constant voltage ($V_{ref}$).

Each circuit will now be described in detail.

The band gap reference circuit 11 is comprised of resistors 24 and 25 which are connected to the output terminal ($V_{REF}$) of the constant voltage generator 10 in parallel and have a same resistance value, a diode-connected transistor 21 which is connected to the other end of the resistor 24, a transistor 22 of which emitter-base area is larger (current capability is larger) than the transistor 21 and which is connected to the other end of the resistor 25 sharing the base voltage with the transistor 21, a resistor 20 which is connected to the emitter of the transistor 22, and a transistor 23 of which base is connected to the connection point between the resistor 25 and the transistor 22, and of which emitter is grounded. The transistors 21, 22 and 23 are NPN types.

In the transistors 22 and 21, a difference is generated in the emitter-base voltage according to the ratio of the emitter-base area of the transistor 22 to the transistor 21. This difference becomes the voltage at both ends of the resistor 20, and the current which is in inverse proportion to the resistance value of the resistor 20 flows through the resistor 20. This current also flows through the resistor 25, and voltage in proportion to this current is generated at both ends of the resistor 25. On the other hand, the voltage at the connection point between the resistor 25 and the transistor 22 is the emitter-base voltage of the transistor 23. Therefore the voltage of the output terminal ($V_{REF}$) of the constant voltage generator 10 is the sum of the voltage at both ends of the resistor 25 which is determined as above, and the emitter-base voltage of the transistor 23. Both of these voltages have an opposite temperature coefficient, so by selecting an appropriate resistance value, the voltage ($V_{ref}$) to be generated by the band gap reference circuit 11 does not depend on temperature. Under this condition, the voltage ($V_{ref}$) becomes about 1.25V.

The current supply circuit 12 is comprised of a PNP type transistor 26 of which emitter is connected to the power supply voltage (VCC) and of which base, that is the control terminal, is controlled by the control current ($I_5$), and a capacitor for stopping oscillation 27.

The starting circuit 13 is comprised of a first and second load elements 29 and 30 for supplying equal current ($I_1$), a diode-connected (base and collector are connected) first transistor 31 which is connected to the first load element 29, a second transistor 32 which shares the voltage of the base with this first transistor 31 and of which collector is connected to the second load element 30, and first and second resistors 33 and 34 which are connected to the transistors 31 and 32 and of which resistance values are the same. The transistors 31 and 32 are NPN types and the second transistor 32 has N times the emitter-base area of the first transistor 31, so it has N times the current capability. In the second transistor 32, the current ($I_2$), which is the sum of the current ($I_1$) from the second load element 30 and the base current ($I_5$) of the transistor 26 of the current supply circuit 12, flows. The load elements 29 and 30 are constant current sources or resistors that can supply equal current ($I_1$).

The voltage-current conversion circuit 14 is comprised of a capacitor for stopping oscillation 35, transistors 36 and 37 which constitute a current mirror circuit for transferring the output current ($I_3$) of the transistor 23 of the band gap reference circuit 11, a resistor 40 for determining the value of a predetermined current ($I_4$) by a resistance value, transistors 38 and 39 for constituting a current mirror circuit for transferring this current ($I_4$), and a transistor 41 of which base is connected to the connection point between transistors 37 and 38. The emitter of the transistor 41 becomes the output of the voltage-current conversion circuit 14, and outputs the feedback current ($I_{comp}$) to the connection point between the transistor 32 and the resistor 34 of the starting circuit 13.

Now the operation will be described focusing on the starting circuit 13.

If the voltage of the output terminal ($V_{REF}$) is 0 when power is started (at startup), the feedback current ($I_{comp}$) from the voltage-current conversion circuit 14 is 0. In this case, the following formula is established in the starting circuit 13.

$$I_1 \times R + V_T \times ln(N \times I_1/I_2) = I_2 \times R \qquad (1)$$

Here $V_T$ is a thermal voltage which is about 26 mV at ordinary temperature. And R is the resistance value of the resistors 33 and 34.

For example, if the value N is 4 and R is 1 kΩ, then the value $I_2$, which is found when $I_1$ is 100 μA by using formula (1), is 129 μA. When $I_1$ is 500 μA, the value of $I_2$, which is found by using formula (1), is 534 μA.

Since the difference between $I_2$ and $I_1$ becomes the base current ($I_5$) of the transistor 26, hfe (current amplification factor) times of current thereof, as starting current ($I_{ref}$), is supplied to the output terminal ($V_{REF}$) and the band gap reference circuit 11, and the voltage generated in the band gap reference circuit 11 rises and reaches the constant voltage ($V_{ref}$).

According to the numeric values of the above example of formula (1), $I_5$ is about 30 μA, so if hfe is 100 then the starting current ($I_{ref}$) becomes about 3 mA. After starting up the power supply (after startup), $I_5$ is adjusted to be less than this value, as described later, so as a value of the supply current ($I_{ref}$), about a maximum of 3 mA of large current output becomes possible.

When the generation voltage of the band gap reference circuit 11 reaches the constant voltage ($V_{ref}$), the transistor 23 turns ON and the current ($I_3$) is supplied to the connection point between the transistors 37 and 38 via the transistors 36 and 37, which constitute the current mirror circuit. The differential current between this current ($I_3$) and a predetermined current ($I_4$) flows to the base of the transistor 41, then the transistor 41 turns ON and feedback current ($I_{comp}$) flows.

Moreover the voltage applied to the resistor 34 of the starting circuit 13 rises, and current ($I_2$) that flows through the transistor 32 decreases. As a result, the base current ($I_5$) of the transistor 26 also decreases, so the current which is supplied from the transistor 26 to the output terminal ($V_{REF}$) also decreases, and stabilizes at a current value according to the load.

When the feedback current ($I_{comp}$) flows, the following formula is established in the starting circuit 13.

$$I_1R+V_T\times ln(NI_1/I_2)=I_2R+I_{comp}R \quad (2)$$

If $I_1=I_2$, namely $I_5=0$ then $$I_{comp}=(V_T/R)\times ln(N) \quad (3)$$

Therefore $I_{comp}$ is in a range where the current values moves from 0 to the value of formula (3).

If the value of the load connected to the output terminal ($V_{REF}$) fluctuates, the negative feedback is activated via the change of the feedback current ($I_{comp}$), and the supply current ($I_{ref}$) changes.

Specifically, if the current consumption is increased by the load connected to the output terminal ($V_{REF}$) and the voltage of the output terminal ($V_{REF}$) slightly decreases, the feedback current ($I_{comp}$) also decreases because the current ($I_3$) of the transistor 23 of the band gap reference circuit 11 decreases.

As a result, the current ($I_2$) of the transistor 32 of the starting circuit 13 increases, and the supply current ($I_{ref}$) also increases. In this way, the drop of the voltage of the output terminal ($V_{REF}$) is compensated by the increase of the supply current ($I_{ref}$), and constant voltage ($V_{ref}$) is stably output.

In the constant voltage generator 10 of the present embodiment, the starting circuit 13 is constituted as above, so that the two stages of forward bias voltage (Vf) does not exist in all the current paths from the power supply voltage (VCC) to the ground potential. Therefore the constant voltage generator 10 can normally output the constant voltage ($V_{ref}$) even if the power supply voltage (VCC) is low voltage.

Figure 5:
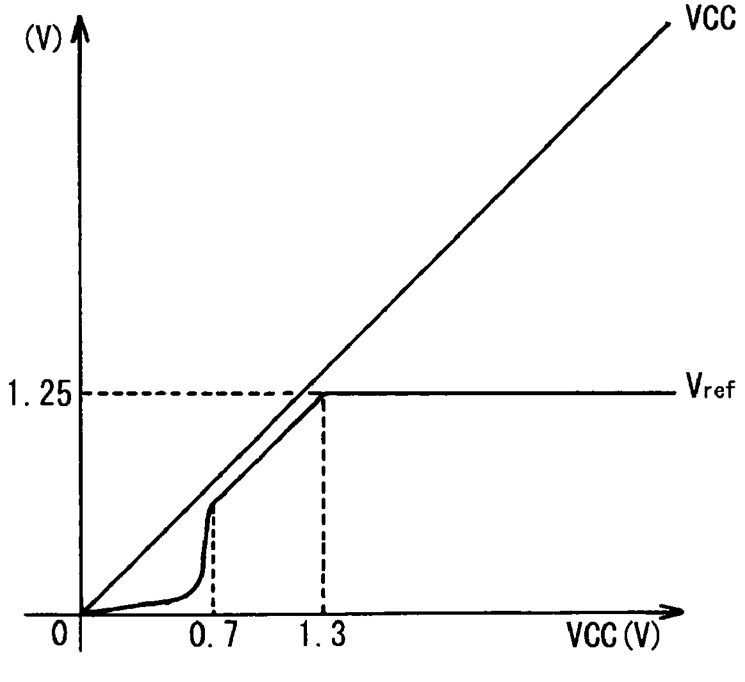
FIG. 5 is a characteristics diagram of the output of the constant voltage generator according to the present embodiment.
Figure 6:
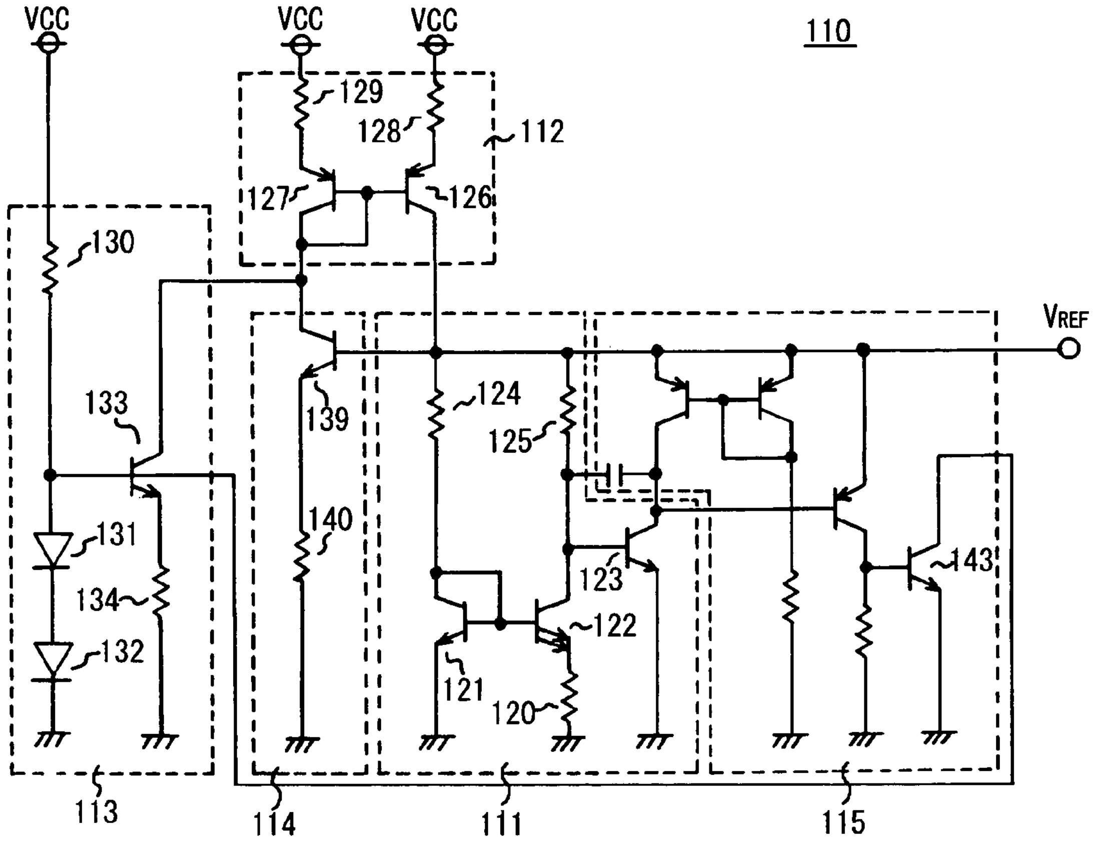
Fig.6 ( Prior art )
FIG. 6 is a circuit diagram of a constant voltage generator according to the first prior art.
Figure 7:
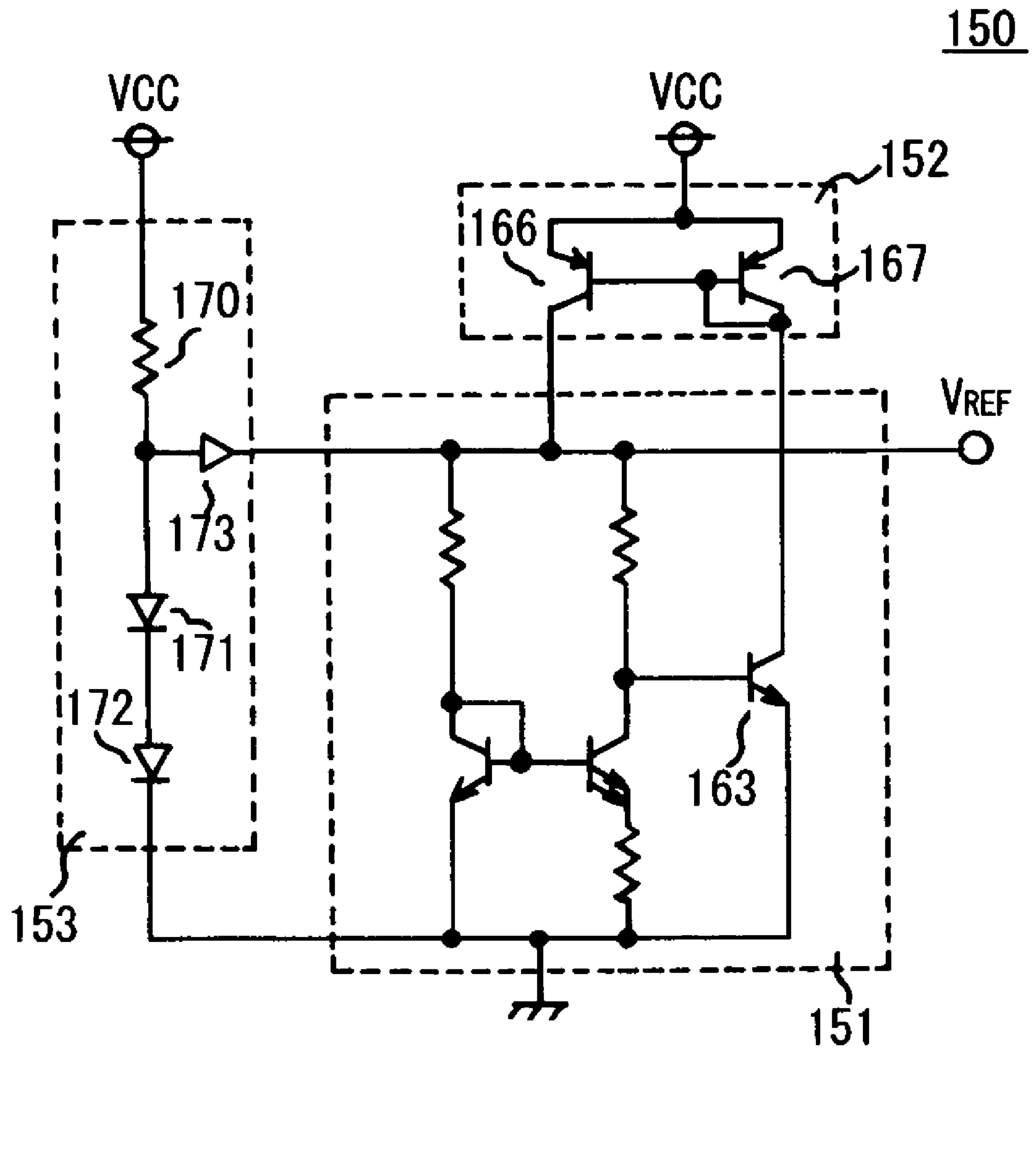
Fig.7 ( Prior art )
FIG. 7 is a circuit diagram of a constant voltage generator according to the second prior art.

FIG. 5 is a characteristics diagram depicting the relationship between the power supply voltage (VCC) and the output terminal ($V_{REF}$) according to the present embodiment. If the power supply voltage (VCC) is larger than 0.7V, which is the forward bias voltage (Vf), the upper limit of the output terminal ($V_{REF}$) becomes the power supply voltage (VCC) minus 0.05V, that is the saturation voltage ($V_{sat}$) of the transistor 26 of the current supply circuit 12. When the power supply voltage (VCC) is 1.3V, a stable voltage ($V_{ref}$), that is 1.25V, is output to the output terminal ($V_{REF}$).

Figure 2:
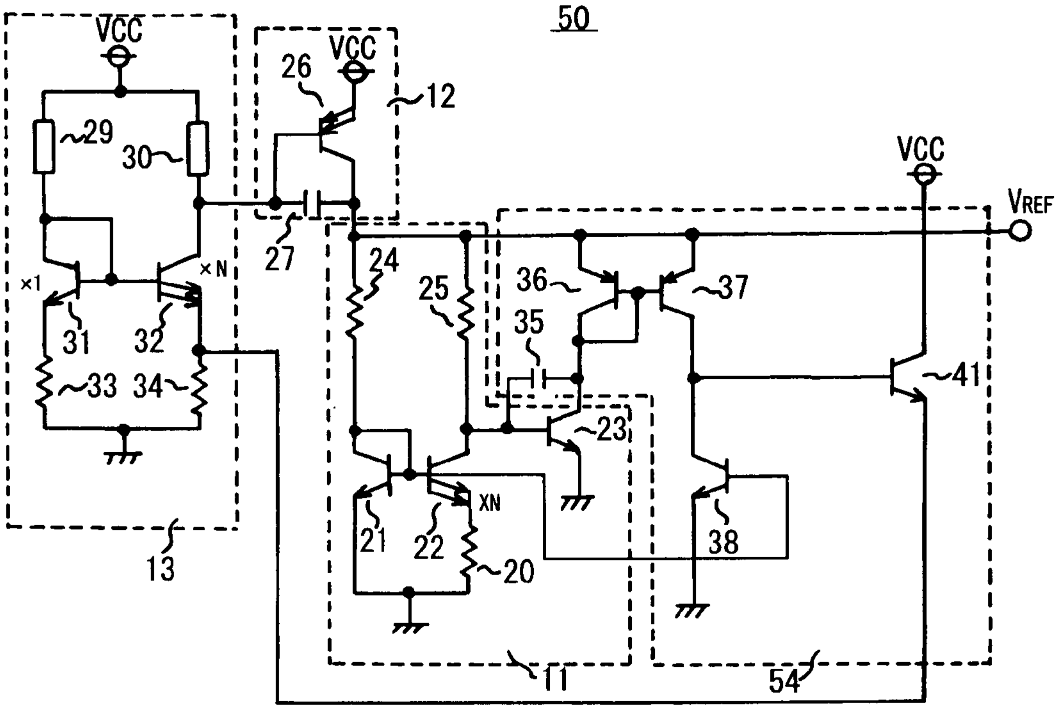
FIG. 2 is a circuit diagram of a constant voltage generator according to the second embodiment of the present invention.

Now the constant voltage generator according to the second embodiment will be described. This constant voltage generator 50 has a voltage-current conversion circuit when the one in the first embodiment is simplified, and FIG. 2 is a circuit diagram thereof.

The voltage-current conversion circuit 54 is comprised of a capacitor for stopping oscillation 35, transistors 36 and 37 which constitute a current mirror circuit, a transistor 38, and a transistor 41. The base of the transistor 38 is commonly connected with the base of the transistor 21 of the band gap reference circuit 11 to be a current mirror, so current in proportion to the current flowing through the transistor 21 flows through the transistor 38. This current and the current flowing through the transistor 37 are compared, and this current substantially operates the same as the first embodiment.

Figure 3:
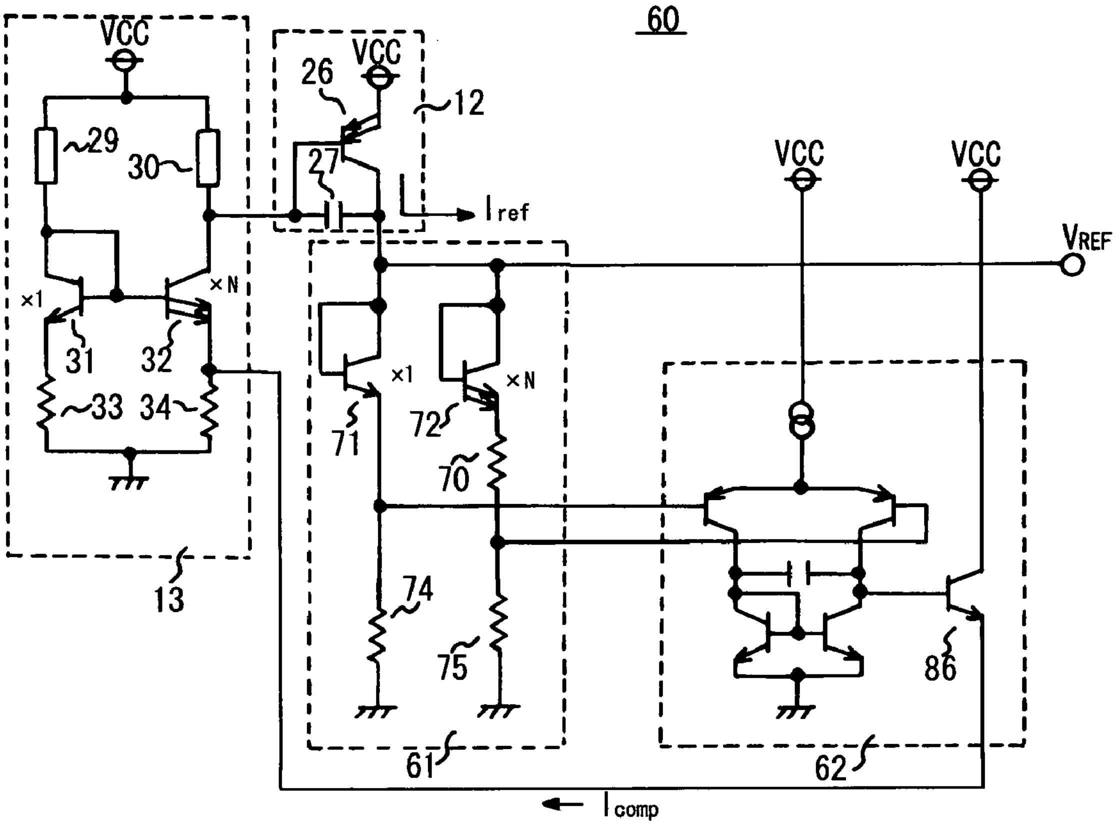
FIG. 3 is a circuit diagram of a constant voltage generator according to the third embodiment of the present invention.

The constant voltage generator according to the third embodiment will now be described. In this constant voltage generator 60, the band gap reference circuit and the voltage-current conversion circuit are different from the first and second embodiments, and FIG. 3 is a circuit diagram thereof.

The band gap reference circuit 61 is comprised of a diode-connected transistor 71, a resistor 74 which is connected to this transistor 71, a diode-connected transistor 72 of which emitter-base area is a predetermined number of times of the transistor 71, a resistor 70 which is connected to this transistor 72, and a resistor 75 which is connected to the other end of the resistor 70. If the output terminal ($V_{REF}$) outputs the constant voltage ($V_{ref}$), the voltage of the connection point between the transistor 71 and the resistor 74 and the voltage of the connection point between the resistor 70 and the resistor 75 match.

The voltage-current conversion circuit 62 is comprised of a differential amplification circuit, and a transistor 86 which outputs the signal thereof. The voltage-current conversion circuit 62 inputs the signal from the connection point between the transistor 71 and the resistor 74 and the signal from the connection point between the resistor 70 and the resistor 75, and outputs the feedback current ($I_{comp}$) corresponding to the difference thereof.

Just like the band gap reference circuit and the voltage-current conversion circuit of the first and second embodiments, if the value of the load connected to the output terminal ($V_{REF}$) changes, negative feedback is activated through the change of the feedback current ($I_{comp}$), and the supply current ($I_{ref}$) changes. And the voltage at the connection point between the transistor 71 and the resistor 74, and the voltage at the connection point between the resistor 70 and the resistor 75 matches. As a result, the output terminal ($V_{REF}$) is maintained at the constant voltage ($V_{ref}$).

Figure 4:
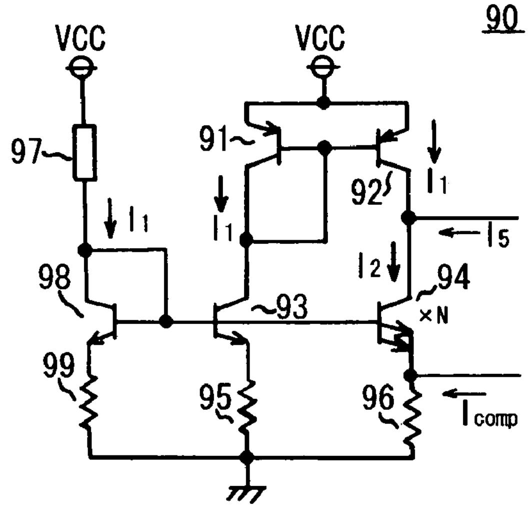
FIG. 4 is a circuit diagram of a starting circuit of a constant voltage generator according to the fourth embodiment.

Now the constant voltage generator according to the fourth embodiment of the present invention will be described. In this embodiment, only the starting circuit is different from the previous three embodiments, and FIG. 4 is a circuit diagram of this starting circuit.

The starting circuit 90 is comprised of transistors 93 and 98 which constitute the constant current source by the current mirror configuration, a transistor 94 which shares the voltage of the base, that is the control terminal, with these transistors 93 and 98, and of which emitter-base area is N times (current capability is N times), resistors 95, 96 and 99 of which the resistance values are the same, a third load element 97 which is a constant current supply or resistor, and transistors 91 and 92 which are the first and second load elements and constitute the current mirror circuit. The group consisted of the third load element 97, transistor 98 and resistor 99, the group consisted of the transistors 91 and 93 and resistor 95, and the group consisted of the transistors 92 and 94 and resistor 96 form the current path from the power supply voltage (VCC) to the ground potential respectively.

The third load element 97 supplies the current ($I_1$), and the current ($I_1$) with the same value as this flows through the transistors 91 and 92. In the transistor 94, current ($I_2$), which is the sum of the current of the transistor 92 and current ($I_5$) for controlling the current supply circuit, flows.

When the power is started up (at startup), formula (1) is established, as described above, and as a result, voltage generated by the band gap reference circuit 11 rises and reaches the constant voltage ($V_{ref}$).

Also as described in the first embodiment, when feedback current ($I_{comp}$) flows, formula (2) is established in the starting circuit 90, and when the value of the load connected to the output terminal ($V_{REF}$) changes, negative feedback is activated.

In the starting circuit 90, both collectors of the transistors 91 and 92 have a voltage lower than the power supply voltage (VCC) for the amount of the forward bias voltage (Vf), so the subtle difference of currents that flow through the transistors 91 and 92 caused by Early effect can be eliminated. Because of this, setting of the current ($I_5$) for controlling the current supply circuit at startup becomes easy.

The constant voltage generators according to the embodiments of the present invention were described above. Using such a constant voltage generator, electronic equipment that can operate even if the power supply voltage (VCC) is low and the large current is consumed can be achieved. The present invention is not limited to these embodiments, and design thereof can be changed in various ways within the scope of the matters stated in the claims. For example, the transistors were described assuming to be bi-polar types in the above embodiments, but needless to say some bi-polar type transistors may be replaced with MOS types.

What is claimed is:

1. A constant voltage generator for outputting constant voltage from an output terminal, comprising:

a band gap reference circuit which is connected to the output terminal and generates constant voltage;

a current supply circuit which is connected to the output terminal and supplies current thereto;

a starting circuit for controlling said current that flows through the current supply circuit during and after startup; and a voltage-current conversion circuit for converting the fluctuation of voltage of the output terminal to the fluctuation of current, wherein said starting circuit further comprises a first and second load elements, a first transistor which is connected to the first load element, a second transistor of which current capability is larger than the first transistor, and which shares the voltage of the control terminal with the first transistor, and is connected to the second load element, a first resistor which is connected to the first transistor, and a second resistor which is connected to the second transistor, and output of said voltage-current conversion circuit is input to the connection point between the second transistor and the second resistor, and the current at the connection point between the second load element and second transistor controls said current supply circuit.

2. The constant voltage generator according to claim 1, wherein said current supply circuit comprises a PNP type transistor of which base is controlled by said current at the connection point between the second load element and second transistor.

3. The constant voltage generator according to claim 1, wherein said first transistor is diode-connected.

4. The constant voltage generator according to claim 1, wherein said first and second transistors are NPN types.

5. The constant voltage generator according to claim 4, wherein said first transistor is diode-connected.

6. The constant voltage generator according to claim 1, wherein said first and second load elements are the constant current supply.

7. The constant voltage generator according to claim 6, further comprising a diode-connected third transistor which shares voltage of the control terminal with said first and second transistors, a third resistor which is connected to the third transistor, and a third load element for supplying current to the third transistor.

8. The constant voltage generator according to claim 7, wherein said first, second and third transistors are NPN types.

9. Electronic equipment operating under the condition that power supply voltage is low and large current is consumed, comprising:

the constant voltage generator according to claim 1.

* * * * *